United States Patent
Ohashi et al.

(10) Patent No.: US 10,788,694 B2
(45) Date of Patent: Sep. 29, 2020

(54) DISPLAY PANEL

(71) Applicant: SHARP KABUSHIKI KAISHA, Sakai, Osaka (JP)

(72) Inventors: Noriyuki Ohashi, Sakai (JP); Yasuhiro Kuroe, Sakai (JP); Yoshihiro Shioaku, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/385,714

(22) Filed: Apr. 16, 2019

(65) Prior Publication Data
US 2019/0324315 A1  Oct. 24, 2019

(30) Foreign Application Priority Data

Apr. 19, 2018 (JP) .................................. 2018-080442

(51) Int. Cl.
G02F 1/1333 (2006.01)
G02F 1/1335 (2006.01)
G02F 1/13357 (2006.01)

(52) U.S. Cl.
CPC .. G02F 1/133308 (2013.01); G02F 1/133305 (2013.01); G02F 1/133512 (2013.01); G02F 1/133611 (2013.01); G02F 2001/133322 (2013.01); G02F 2001/133354 (2013.01)

(58) Field of Classification Search
None
See application file for complete search history.

(56) References Cited

U.S. PATENT DOCUMENTS

| | | | |
|---|---|---|---|
| 2011/0181808 A1* | 7/2011 | Kobayashi | G02F 1/1341 349/61 |
| 2012/0200820 A1* | 8/2012 | Sato | G02F 1/1333 349/153 |
| 2013/0286315 A1* | 10/2013 | Yanagisawa | G02F 1/1339 349/44 |
| 2014/0104512 A1* | 4/2014 | Huang | G06F 3/03547 349/12 |
| 2015/0241721 A1 | 8/2015 | Tanabe | |
| 2017/0068131 A1 | 3/2017 | Tanabe | |
| 2017/0097539 A1 | 4/2017 | Yanagisawa | |

FOREIGN PATENT DOCUMENTS

| | | |
|---|---|---|
| JP | 2011-154155 A | 8/2011 |
| JP | 2013-228753 A | 11/2013 |
| JP | 2013-231786 A | 11/2013 |
| JP | 2015-155987 A | 8/2015 |

* cited by examiner

*Primary Examiner* — Jessica M Merlin
*Assistant Examiner* — Mark D Teets
(74) *Attorney, Agent, or Firm* — ScienBiziP, P.C.

(57) ABSTRACT

A display panel includes: a display area in which an image is to be displayed; a non-display area in which no image is to be displayed; a first mark that is arranged in the non-display area; a second mark that is arranged in the non-display area on a layer different from a layer on which the first mark is arranged and is adjacent to or superimposed on the first mark in a plan view; a light-transmitting portion that is arranged in the non-display area in such a manner as to overlap at least the first mark in a plan view; and a light-shielding portion that is arranged in the non-display area on a side opposite to the light-transmitting portion with respect to the first mark and the second mark and overlaps the light-transmitting portion in a plan view.

3 Claims, 17 Drawing Sheets

DISPLAY PANEL

CROSS REFERENCE TO RELATED APPLICATION

This application claims priority from Japanese Patent Application No. 2018-80442 filed on Apr. 19, 2018. The entire contents of the priority application are incorporated herein by reference.

TECHNICAL FIELD

The technology described herein relates to a display panel.

BACKGROUND

Conventionally, there is known a display panel in which marks are provided in non-display areas. As such marks, alignment marks are observed with a camera to align a liquid crystal display panel and a back) with high accuracy. An example of such a display panel is disclosed in Japanese Unexamined Patent Application Publication No. 2015-155987. There is also known a display panel in which a pair of marks is provided in the non-display area and the amount of positional deviation of one of the marks from the other of the marks is measured to check the positional accuracy of a member with the other mark with reference to the one mark.

In the foregoing configuration, in order to observe the marks, it is necessary to provide a light-transmitting portion such as an opening in a part of the display panel. However, when the light-transmitting portion is provided, light may leak through the light-transmitting portion.

SUMMARY

The technology described herein was made in view of the above circumstances. An object is to provide a display panel that allows observation of marks while suppressing light leakage.

A display panel according to the technology described herein includes: a display area in which an image is to be displayed; a non-display area in which no image is to be displayed; a first mark that is arranged in the non-display area; a second mark that is arranged in the non-display area on a layer different from a layer on which the first mark is arranged and is adjacent to or superimposed on the first mark in a plan view; a light-transmitting portion that is arranged in the non-display area in such a manner as to overlap at least the first mark in a plan view; and a light-shielding portion that is arranged in the non-display area on a side opposite to the light-transmitting portion with respect to the first mark and the second mark and overlaps the light-transmitting portion in a plan view. According to this configuration, it is possible to observe the first mark and the second mark through the light-transmitting portion, thereby to measure the amount of positional deviation of the second mark from the first mark. This makes it possible to check, for example, the positional accuracy of a member in a specific positional relationship with the second mark (for example, a substrate on which the second mark is provided). However, when the light-transmitting portion is provided in the non-display area, light may pass through the light-transmitting portion and leaks to the outside of the display panel, for example. Providing the light-shielding portion to overlap the light-transmitting portion can suppress such light leakage. The light-shielding portion is arranged on the side opposite to the light-transmitting portion with respect to the first mark and the second mark in such a manner as not to hinder the observation of the first mark and the second mark through the light-transmitting portion.

According to the technology described herein, it is possible to observe the marks while suppressing light leakage.

DETAILED DESCRIPTION

First Embodiment

Figure 1:
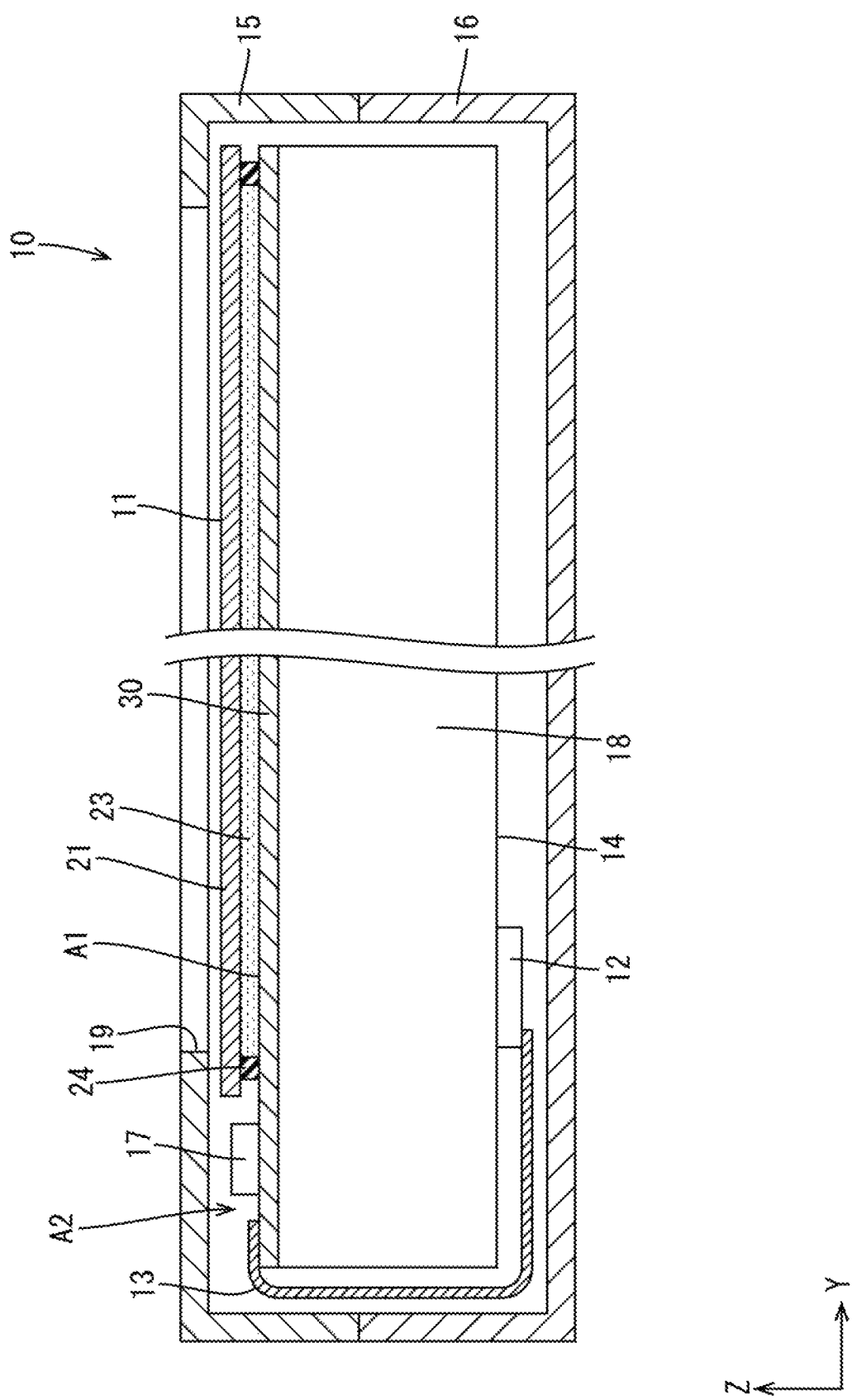
FIG. 1 is a schematic cross-sectional view of a schematic configuration of a liquid crystal display device.

A first embodiment will be described with reference to FIGS. 1 to 7. A liquid crystal display device 10 includes, as illustrated in FIG. 1: a liquid crystal panel 11 (display panel); a control circuit substrate 12 that supplies various input signals to a driver 17 included in the liquid crystal panel 11; a flexible substrate 13 that electrically connects the liquid crystal panel 11 and the control circuit substrate 12; and a backlight device 14 (lighting device) that supplies light to the liquid crystal panel 11. The backlight device 14 includes, as illustrated in FIG. 1: a chassis 18 that has a substantially box shape opened to the front side (the liquid crystal panel 11 side); a light source (for example, cold-cathode tube, LED, organic EL, or the like) that is disposed in the chassis 18; and an optical member that covers an opening part of the chassis 18. The optical member has the function of converting light emitted from the light source into a planar form.

The liquid crystal display device 10 also includes, as illustrated in FIG. 1, a pair of front and back exterior members 15 and 16 that stores the liquid crystal panel 11 and the backlight device 14 assembled together. The front exterior member 15 has an opening part 19 such that the image displayed in the display area A1 of the liquid crystal panel 11 can be seen from the outside. The liquid crystal display device 10 according to the present embodiment is used for various kinds of electronic equipment such as mobile phones (including smartphones and others), notebook computers (including tablet-type notebook computers and others), wearable terminals (including smartwatches and others), mobile information terminals (including e-books, PDAs, and others), mobile game machines, and digital photo frames.

The liquid crystal panel 11 includes, as illustrated in FIG. 1: a pair of substrates 21 and 30 opposed to each other; a liquid crystal layer 23 (medium layer) that is disposed between the pair of substrates 21 and 30 and includes liquid crystal molecules as a substance with optical characteristics varying with application of an electric field; and a seal member 24 that is disposed between the pair of substrates 21 and 30 and surrounds the liquid crystal layer 23 to seal the liquid crystal layer 23. Of the pair of substrates 21 and 30, the front (front surface side, the upper side of FIG. 1) substrate is a CF substrate 21 (opposing substrate), and the back (rear surface side) substrate is an array substrate 30 (active matrix substrate, element-side substrate). The liquid crystal panel 11 has a display area A1 where an image is to be displayed and a non-display area A2 where no image is to be displayed. The non-display area A2 has a frame shape surrounding the display area A1 in the plan view of FIG. 3. Polarizing plates are attached to the outer surfaces of the substrates 21 and 30. On the inner surfaces of the substrates 21 and 30 in contact with the liquid crystal layer 23, an alignment film for orienting the liquid crystal molecules included in the liquid crystal layer 23 is provided.

Figure 2:
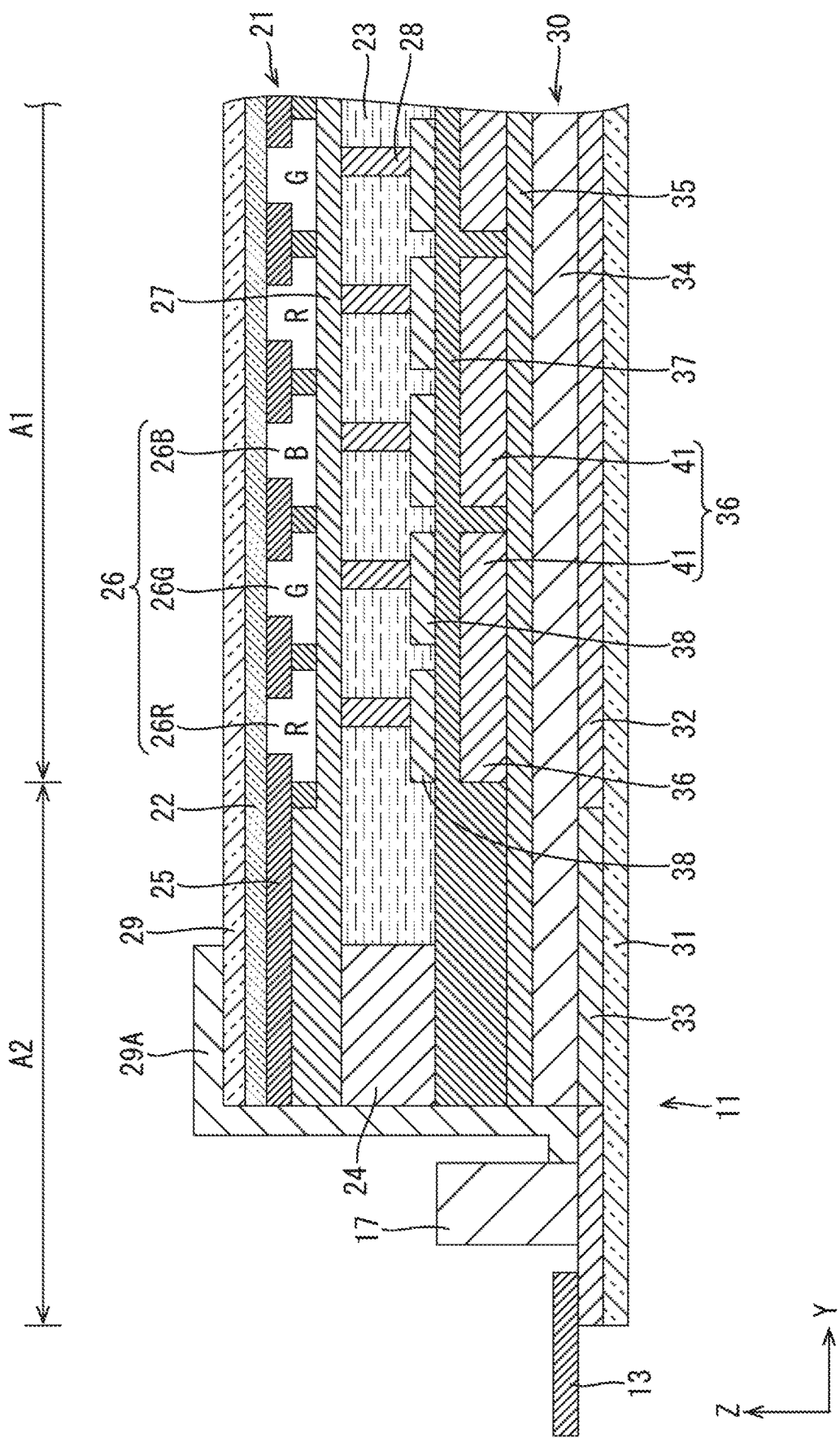
FIG. 2 is a cross-sectional view of a liquid crystal panel.

As illustrated in FIG. 2, the CF substrate 21 includes a glass substrate 22. The CF substrate 21 is formed by stacking a black matrix 25, a color filter 26, and an overcoat film 27 on the inner surface side of the glass substrate 22 (a glass substrate 31 side described later). The color filter 26 includes colored portions 26R, 26G, and 26B (colored layers) of three colors red (R), green (G), and blue (B) arranged in a matrix. Further, the CF substrate 21 includes spacers 28 for holding a cell gap. A transparent electrode film 29 is provided on the surface of the glass substrate 22. The transparent electrode film 29 is connected to a ground pad provided on the array substrate 30 via a conductive paste 29A. This makes it possible to cut noise from the outside by the transparent electrode film 29.

Figure 3:
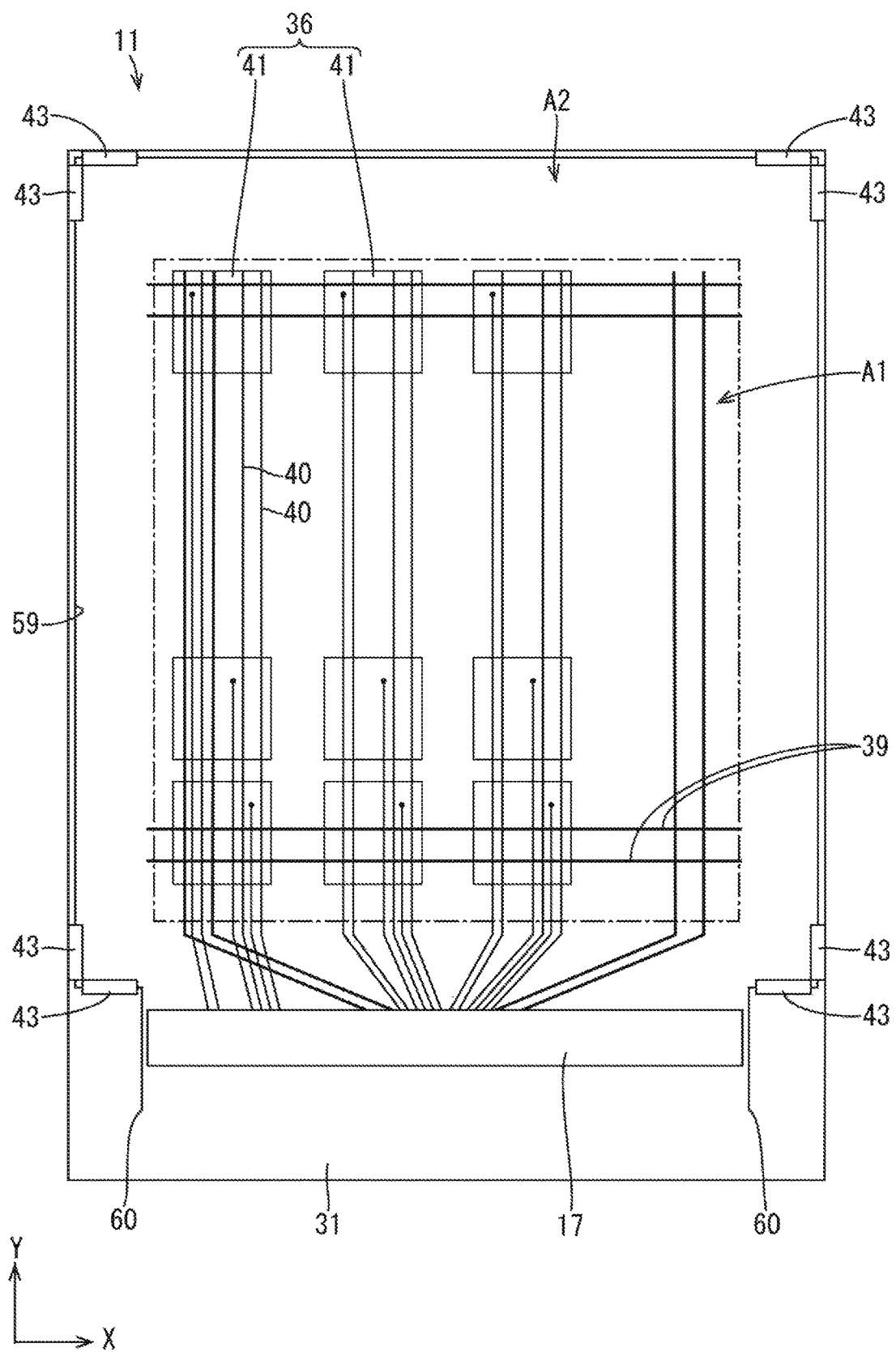
FIG. 3 is a schematic plan view of the liquid crystal panel.
Figure 4:
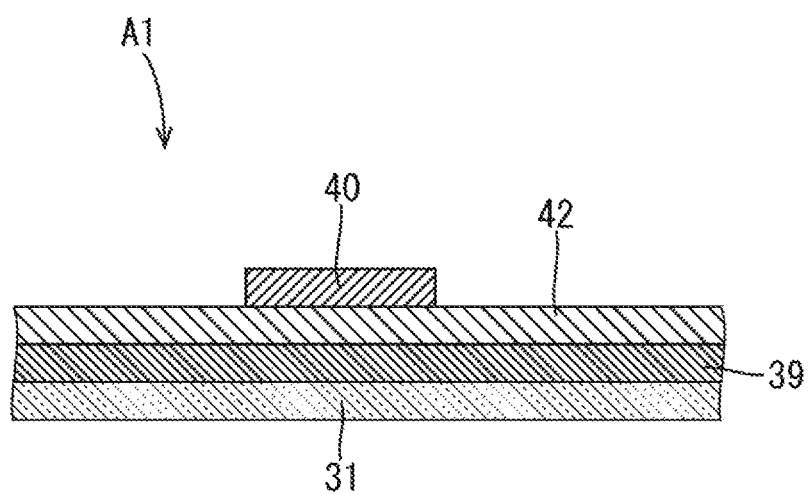
FIG. 4 is a cross-sectional view of a gate line and a source line.

The array substrate 30 includes a glass substrate 31 opposed to the glass substrate 22. As illustrated in FIG. 2, provided on the inner surface of the glass substrate 31 are a pixel circuit unit 32, a peripheral circuit unit 33, a flattening film 34, a touch panel line 35, a common electrode 36, an insulating film 37, and pixel electrodes 38. The pixel circuit unit 32 at least includes gate lines 39 (see FIG. 3) for transmitting a scanning signal, source lines 40 (see FIG. 3) for transmitting an image signal, thin film transistors (TFT) as switching elements connected to the gate lines 39 and the source lines 40, all of which are arranged in the display area A1. Each of the gate lines 39 is made of a metal film and extends along the X-axis direction as illustrated in FIG. 3. A large number of the gate lines 39 are arranged at intervals along the Y-axis direction. Each of the source lines 40 is made of a metal film and extends along the Y-axis direction. A large number of the source lines 40 are arranged at intervals along the X-axis direction. As illustrated in FIG. 4, an insulating film 42 is interposed between each of the gate lines 39 and each of the source lines 40. Each of the TFTs has a known structure having a channel portion made of a semiconductor film and the like, and is connected to the pixel electrode 38. The TFTs are driven on the basis of the scanning signal transmitted to the gate lines 39 and supply the image signal transmitted to the source lines 40 to the pixel electrodes 38 via the channel portion to charge the pixel electrodes 38 to a predetermined potential. The TFTs and the pixel electrodes 38 are arranged in a region surrounded by the gate line 39 and the source line 40. Large numbers of the TFTs and the pixel electrodes 38 are arranged in a matrix form along the X-axis direction and the Y-axis direction.

Each of the pixel electrodes 38 and the common electrode 36 is made of a transparent electrode film. The common electrode 36 has the same size as the display area A1 as a whole. However, the common electrode 36 is divided into a lattice shape, and the divided segments (touch electrodes 41) overlap the pixel electrodes 38 and are connected to the driver 17 via the touch panel line 35. The common electrode 36 is supplied with a substantially constant reference potential at least for a display period such that a difference in potential can be generated between the common electrode 36 and the pixel electrodes 38 based on the potential at which the pixel electrodes 38 were charged. The electric field generated based on the difference in potential between the common electrode 36 and the pixel electrodes 38 includes a fringe electric field (oblique electric field) containing a component along the plate surface of the array substrate 30 and a component along a normal direction to the plate surface of the array substrate 30. Therefore, the liquid crystal panel 11 is in a fringe field switching (FFS) mode in which the oriented state of the liquid crystal molecules in the liquid crystal layer 23 is controlled by using the fringe electric field. The driving method of the liquid crystal is not limited to the FFS mode. In addition, the common electrode 36 plays a role of a touch electrode that detects a change in the electrostatic capacitance responsive to a position input in the non-display period. The common electrode 36 has an in-cell touch panel function to specify the input position in the display area A1 by calculating the change in the electrostatic capacitance by the driver 17. The peripheral circuit unit 33 can be a gate driver circuit, for example. The peripheral circuit unit 33 is monolithically formed on the glass substrate 31 in the non-display area A2. The gate driver circuit is connected to each of the gate lines 39 so that the gate lines 39 can be sequentially scanned to drive the TFTs.

Each of the lines (the touch panel line 35, the gate lines 39, the source lines 40) described above is made of a conductive film of copper, titanium, aluminum, molybdenum, or tungsten, for example. The insulating films 37 and 42 described above are made of an inorganic material such as silicon nitride ($SiN_x$) or silicon oxide ($SiO_2$), for example. The flattening film 34 described above is made of an organic material such as an acrylic resin (for example, PMMA). Each of the transparent electrode films (the transparent electrode film 29, the common electrode 36, and the pixel electrodes 38) described above is made of a transparent electrode material such as indium tin oxide (ITO) or indium zinc oxide (IZO). The materials of the lines, the insulating films, the flattening film, and the transparent electrode films are not limited to the examples described herein, and can be changed as appropriate.

Figure 5:
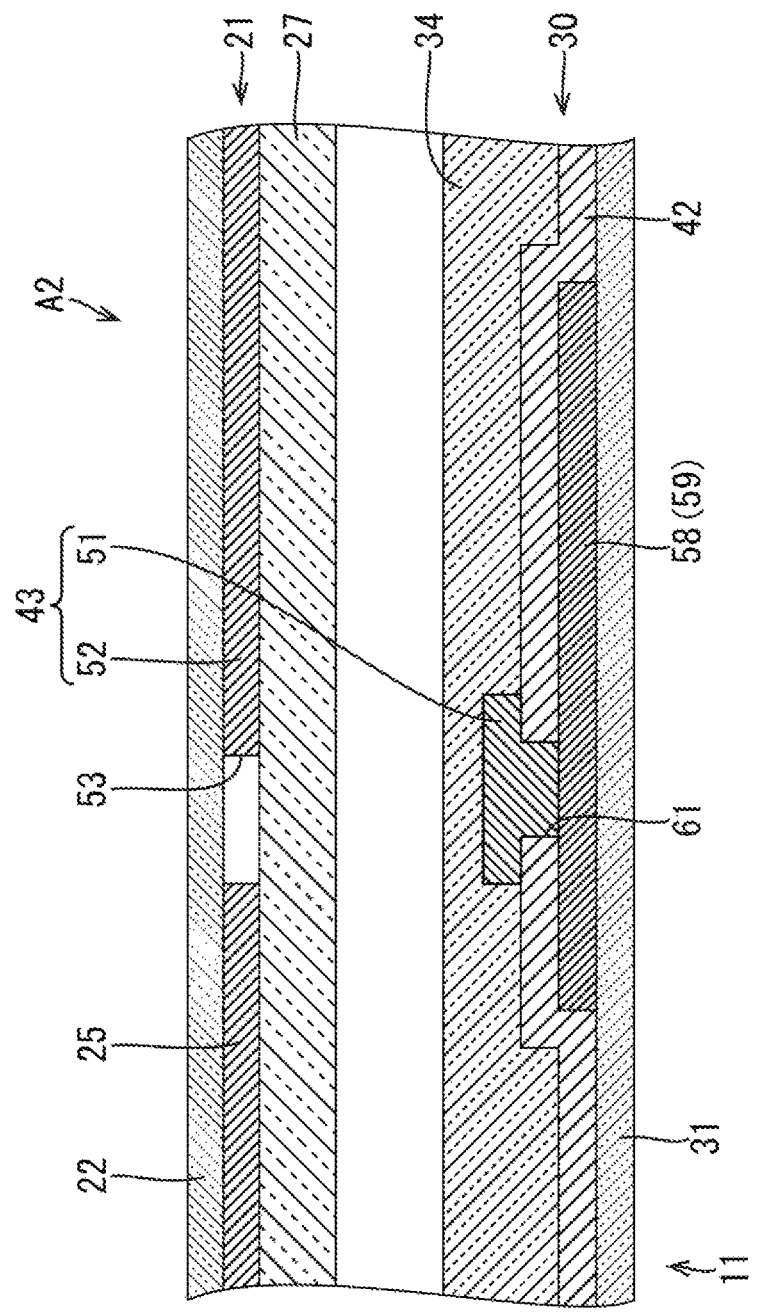
FIG. 5 is a cross-sectional view of a first mark and a second mark.
Figure 6:
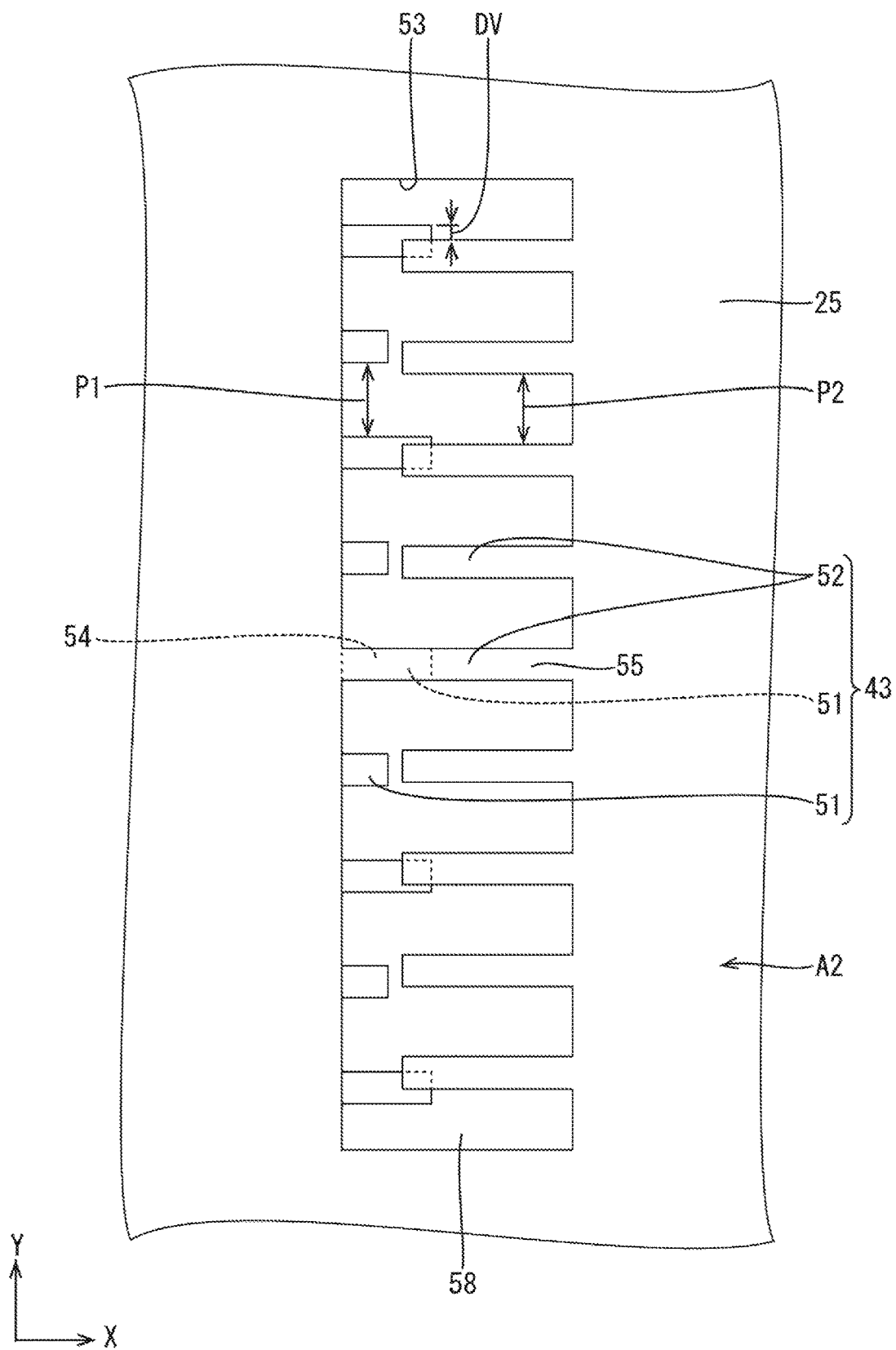
FIG. 6 is a plan view of the first mark and the second mark (with no positional deviation).
Figure 7:
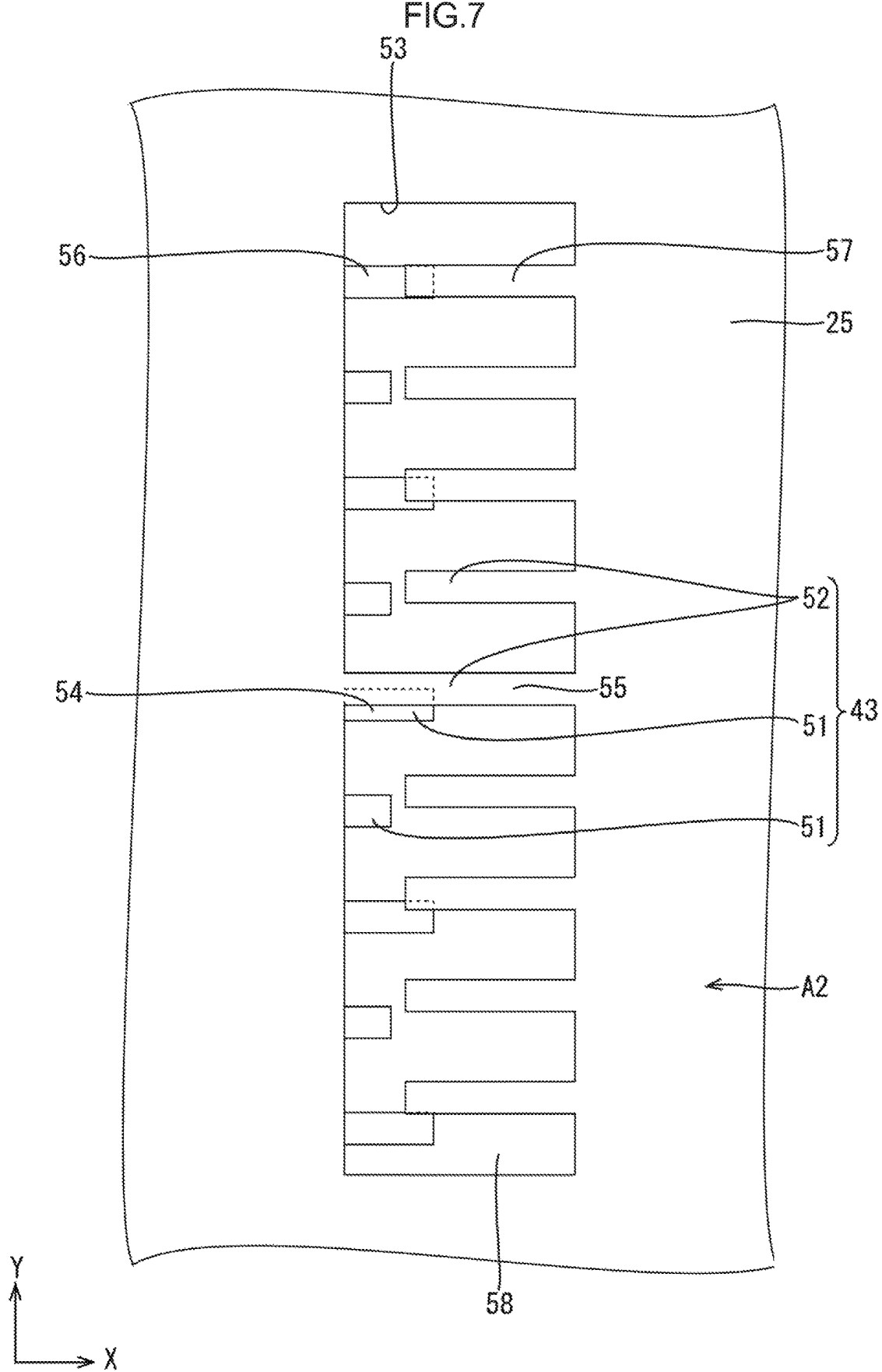
FIG. 7 is a plan view of the first mark and the second mark (with positional deviation).

In the non-display area A2, as illustrated in FIG. 3, verniers 43 are arranged to measure the positional accuracy of the pair of substrates 21 and 30 bonded together. As illustrated in FIGS. 5 and 6, the verniers 43 include a first mark 51 provided on the glass substrate 31 (one substrate) of the array substrate 30 and a second mark 52 provided on the glass substrate 22 (the other substrate) of the CF substrate 21. As illustrated in FIG. 6, the first mark 51 is a vernier pattern having graduations aligned along the Y-axis direction (or the X-axis direction). The first mark 51 is disposed on the same layer as the source lines 40 (lines), and is formed from a conductive film (conductive member) made of the same material as that of the source lines 40.

The second mark 52 is disposed on a layer different from the layer on which the first mark 51 is disposed. In the plan view of the liquid crystal panel 11 (the liquid crystal panel 11 seen from the front side or the back side as illustrated in FIG. 6), the second mark 52 is disposed adjacent to the first mark 51. The second mark 52 is a vernier pattern with graduations. The graduations of the second mark 52 are aligned parallel to the graduations of the first mark 51. Referring to FIG. 6, the graduations constituting the first mark 51 and the second mark 52 are aligned along the longitudinal direction (Y-axis direction) of the array substrate 30. The first mark 51 and the second mark 52 are designed to measure the positional accuracy of the pair of substrates 21 and 30 bonded together. Specifically, the first mark 51 and the second mark 52 are designed to measure how much the pair of substrates 21 and 30 is deviated in position from each other in the alignment direction of the graduations (the Y-axis direction in FIG. 6).

The second mark 52 is formed from the edge portion of a comb-like opening 53 formed in the black matrix 25. The opening 53 (light-transmitting portion) is arranged in such a manner as to overlap the first mark 51 in a plan view in the non-display area A2. FIG. 6 illustrates a state in which the first mark 51 and the second mark 52 are not deviated in position from each other in the Y-axis direction. In this state, a graduation 54 (reference graduation) disposed in the center among the graduations of the first mark 51 and a graduation 55 disposed in the center (reference graduation) among the graduations of the second mark 52, are aligned to coincide with each other in the Y-axis direction. The line width of the graduations constituting the first mark 51 is equal to the line width of the graduations constituting the second mark 52. A pitch P1 of the graduations constituting the first mark 51 is set to a value slightly greater than a pitch P2 of the graduations constituting the second mark 52.

The relationship DV=N*DP holds where the difference between the pitch P1 and the pitch P2 is DP, and in the plan view (see FIG. 6), the amount of positional deviation of the N-th graduations with respect to the graduations 54 and 55 as a reference (0) (the amount of positional deviation as seen in the alignment direction of the graduations) is DV. Therefore, the amount of positional deviation of the second mark 52 from the first mark 51 can be measured by checking with a camera or the like which of the graduations constituting the first mark 51 and which of the graduations constituting the second mark 52 coincide with each other in the alignment direction of the graduations. More specifically, referring to FIG. 7, the fourth graduations 56 and 57 from the graduations 54 and 55 as a reference on the upper side (one side as seen in the Y-axis direction) of FIG. 7 coincide with each other (the end portions of the graduations 56 and 57 completely overlap). Accordingly, in the example illustrated in FIG. 7, it can be seen that the second mark 52 is deviated from the first mark 51 to the upper side of FIG. 7 and that the positional deviation amount DV is 4*DP.

In the present embodiment, as illustrated in FIG. 3, the verniers 43 extending in the X-axis direction and the verniers 43 extending in the Y-axis direction are disposed at the four corners of the liquid crystal panel 11. The verniers 43 extending in the X-axis direction are designed to measure the positional deviation amount of the pair of substrates 21 and 30 in the X-axis direction, and the verniers 43 extending in the Y-axis direction are designed to measure the positional deviation amount of the pair of substrates 21 and 30 in the Y-axis direction.

In the present embodiment, forming the opening 53 in the black matrix 25 makes it possible to observe the first mark 51 from the front side through the opening 53, thereby observing the positional relationship between the first mark 51 and the second mark 52. However, providing the opening 53 may cause leakage of light from the backlight device 14 (see FIG. 1) to the front side through the opening 53. Therefore, in the present embodiment, a light-shielding portion 58 is disposed in the non-display area A2 on the side opposite to the opening 53 with respect to the first mark 51 and the second mark 52 as illustrated in FIG. 6. In other words, the black matrix 25 is an opposite-side light-shielding portion disposed on the side opposite to the light-shielding portion 58 with respect to the first mark 51.

The light-shielding portion 58 is arranged to overlap the opening 53 in a plan view. As illustrated in FIG. 3, a ground line 59 is arranged in the non-display area A2. The ground line 59 is arranged on the glass substrate 31 and extends along the outer peripheral end portions of the glass substrate 31. End portions 60 and 60 of the ground line 59 are connected to the ground via the flexible substrate 13. The ground line 59 has a function of preventing intrusion of electric noise from the outside, for example. The verniers 43 are arranged on the path of the ground line 59, and the light-shielding portion 58 is formed by a part of the ground line 59. The ground line 59 is disposed in the same layer as the gate line 39 and is made of the same material as the gate line 39. Accordingly, the ground line 59 can be formed in the step of forming the gate line 39. The light-shielding portion 58 has a rectangular shape which is slightly larger than the opening 53 in a plan view, and the outer peripheral end surface of the light-shielding portion 58 is arranged outside the opening 53. The light-shielding portion 58 is preferably sized to covers the opening 53 with reliability. Specifically, the distance between the outer peripheral end surface of the light-shielding portion 58 and the inner surface of the opening 53 is preferably 10 μm or more, for example, over the entire periphery of the light-shielding portion 58. As illustrated in FIG. 5, the first mark 51 is electrically connected to the light-shielding portion 58 via a contact hole 61 formed in the insulating film 42. Besides the gate line 39, a light shield layer of a transistor can be used as the light-shielding portion 58. The light shield layer is a light-shielding film for preventing light from hitting the channel portion of the transistor. If intense light of a backlight hits the channel portion of the transistor, SD leakage occurs to lower the display quality. To take a measure against this, the light shield layer is required for a high definition panel having a small pixel capacity. This light shield layer can also be connected to the ground via the contact hole.

Next, the advantageous effects of the present embodiment will be described. In the present embodiment, it is possible to observe the first mark 51 and the second mark 52 through the opening 53, thereby to measure the amount of positional deviation of the second mark 52 from the first mark 51. This makes it possible to check the accuracy of bonding the array substrate 30 with the first mark 51 and the CF substrate 21 with the second mark 52. As a result, after bonding together the CF substrate 21 and the array substrate 30, for example, it is possible to easily check and manage the accuracy of the bonding. For example, in the manufacturing process, even if the accuracy of bonding the CF substrate 21 and the array substrate 30 deteriorates, this can be discovered quickly and measures can be taken.

However, in the case where the opening 53 is provided in the non-display area A2, light emitted from the backlight device 14 toward the pair of substrates 21 and 30 may pass through the opening 53 and leak to the outside, for example. Providing the light-shielding portion 58 to overlap the opening 53 makes it possible to block the light from the backlight device 14 toward the opening 53, thereby suppressing light leakage due to the opening 53. The light-shielding portion 58 is arranged on the side opposite to the opening 53 with respect to the first mark 51 and the second mark 52 in such a manner as not to hinder the observation of the first mark 51 and the second mark 52 through the opening 53.

Further, the black matrix 25 is disposed in the non-display area A2 on the side opposite to the light-shielding portion 58 with respect to the first mark 51. The first mark 51 is graduations. The second mark 52 is graduations arranged in parallel with the graduations of the first mark 51 and is constituted by the edge portion of the comb-like opening 53 formed in the black matrix 25. Providing the black matrix 25 makes it possible to suppress light leakage more reliably. Forming the opening 53 in the black matrix 25 makes it possible to form simultaneously the light-transmitting portion for observing the first mark 51 and the second mark 52, thereby reducing the number of manufacturing steps.

The light-shielding portion 58 is a part of the ground line 59 connected to the ground, and the first mark 51 is formed of a conductive member and is electrically connected to the light-shielding portion 58. Forming integrally the light-shielding portion 58 and the around line 59 achieves a simpler configuration. Electrically connecting the first mark 51 and the ground line 59 preferably reduces line resistance. The source line 40 is disposed in the display area A1, and the first mark 51 is disposed in the same layer as the source line 40 and is made of the same material as the source line 40. According to this configuration, it is possible to form the first mark 51 in the step of forming the source line 40.

Second Embodiment

Figure 8:
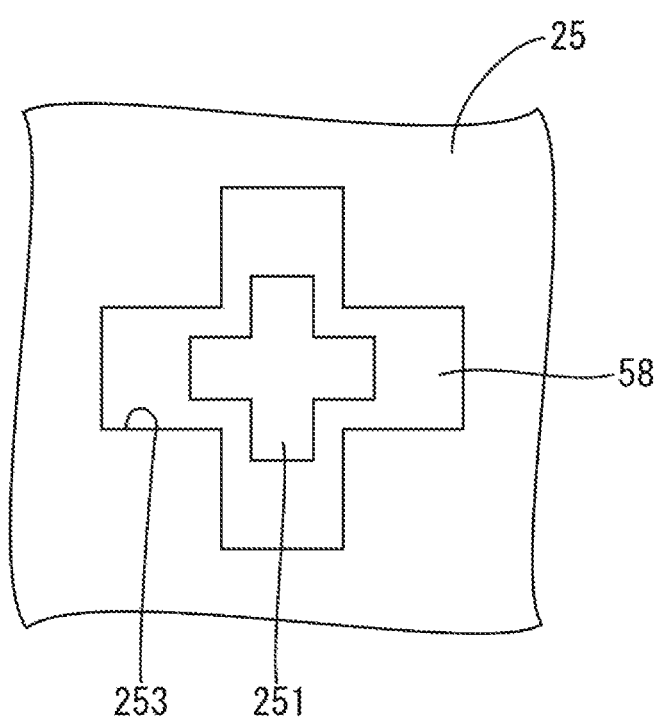
FIG. 8 is a plan view of a first mark and a second mark according to a second embodiment.

Next, a second embodiment will be described with reference to FIG. 8. The same elements as those of the foregoing embodiment will be given the same reference signs as those of the foregoing embodiment, and duplicated descriptions thereof will be omitted. In the present embodiment, the first mark and the second mark are configured differently from those in the embodiment described above. In the present embodiment, as illustrated in FIG. 8, a first mark 251 has a cross shape, and a cross-shaped opening 253 slightly larger than the first mark 251 is formed in a black matrix 25. In a plan view, the first mark 251 and the opening 253 have the same central axis in both the X-axis direction and the Y-axis direction. In the present embodiment, a second mark and a light-transmitting portion are constituted by the opening 253. The accuracy of bonding a pair of substrates 21 and 30 can be checked by measuring the amount of positional deviation of the opening 253 from the first mark 251 in both the X-axis direction and the Y-axis direction. Forming the opening 253 in the black matrix 25 makes it possible to form simultaneously the light-transmitting portion for observing the first mark 51 and the second mark, thereby reducing the number of manufacturing steps. The shapes of the first mark 251 and the opening 253 are not limited to the cross shape but can be changed as appropriate.

The first mark 251 and the opening 253 may have a rectangular shape, a polygonal shape, a circular shape, an L shape, or the like.

Third Embodiment

Figure 9:
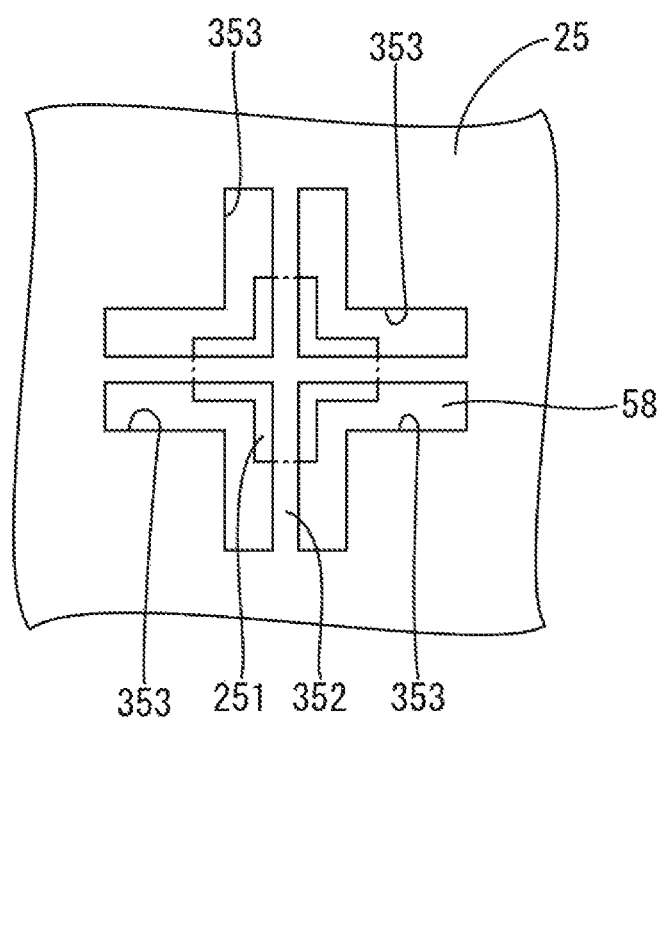
FIG. 9 is a plan view of a first mark and a second mark according to a third embodiment.

Next, a third embodiment will be described with reference to FIG. 9. The same elements as those of the foregoing embodiment will be given the same reference signs as those of the foregoing embodiment, and duplicated descriptions thereof will be omitted. In the present embodiment, the first mark and the second mark are configured differently from those in the embodiment described above. In the present embodiment, as illustrated in FIG. 9, four L-shaped openings 353 are formed in the black matrix 25. Thus, in the black matrix 25, a portion surrounded by the four openings 353 constitutes a second mark 352 having a cross shape. In a plan view, a first mark 251 and a second mark 352 have the same central axis in both the X-axis direction and the Y-axis direction. In the present embodiment, the accuracy of bonding a pair of substrates 21 and 30 can be checked by measuring the amount of positional deviation of the second mark 352 from the first mark 251 in both the X-axis direction and the Y-axis direction.

Fourth Embodiment

Figure 10:
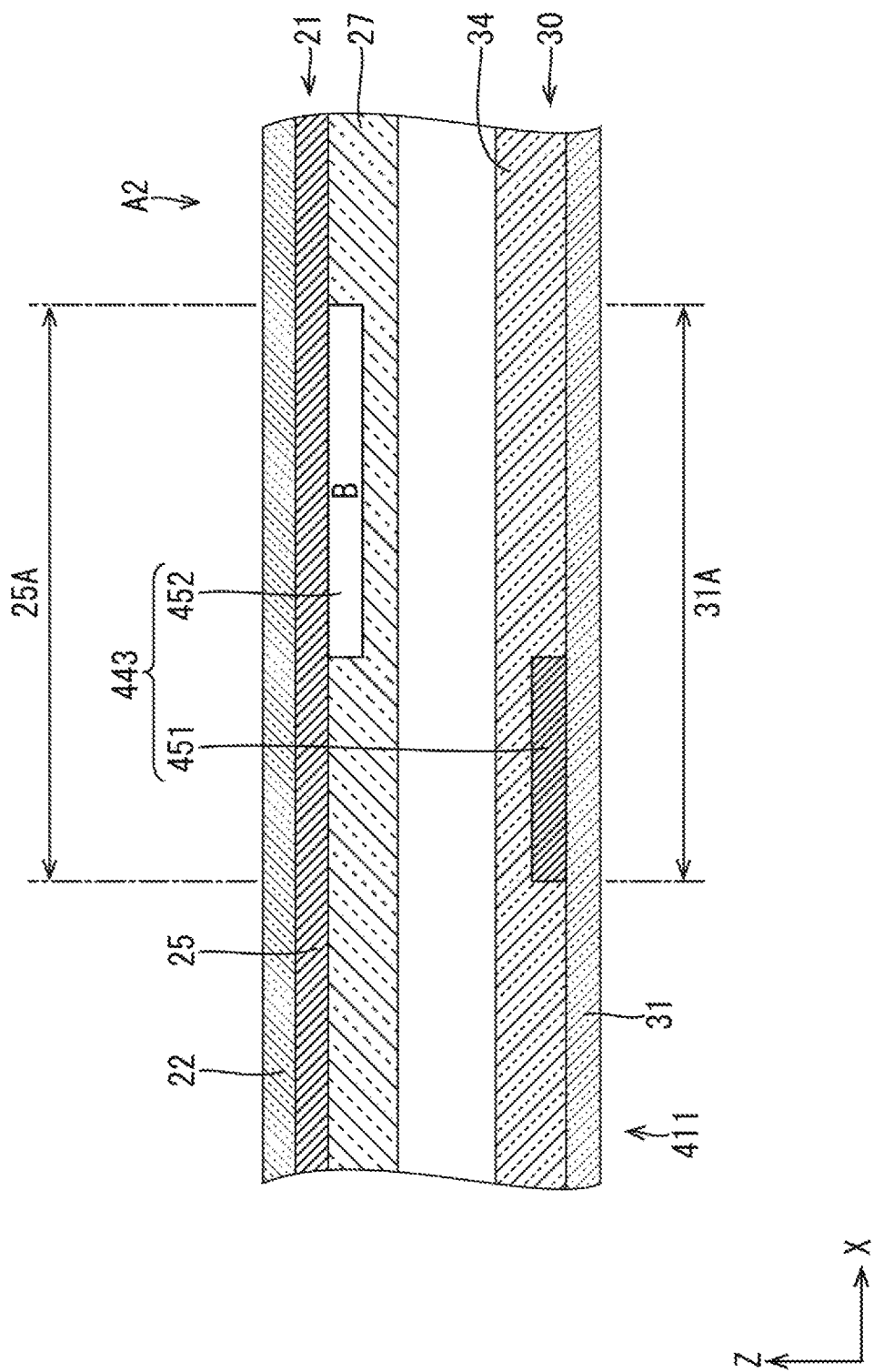
FIG. 10 is a cross-sectional view of a first mark and a second mark according to a fourth embodiment.
Figure 11:
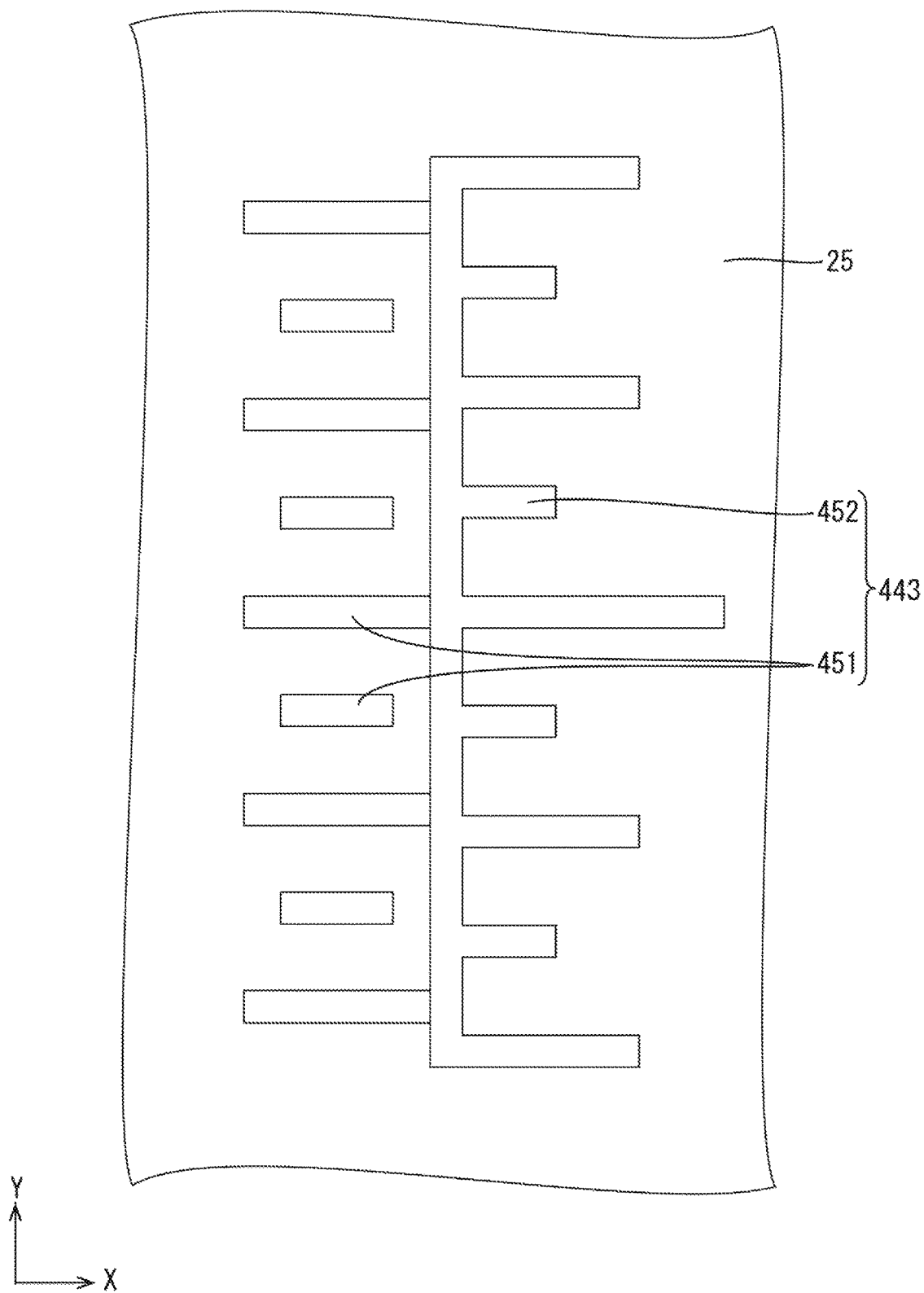
FIG. 11 is a plan view of the first mark and the second mark according to the fourth embodiment.

Next, a fourth embodiment will be described with reference to FIGS. 10 and 11. The same elements as those of the foregoing embodiment will be given the same reference signs as those of the foregoing embodiment, and duplicated descriptions thereof will be omitted. In the present embodiment, the first mark and the second mark are configured differently from those in the embodiment described above. A liquid crystal panel 411 of the present embodiment includes a first mark 451 and a second mark 452 constituting a vernier 443 as illustrated in FIG. 10. The second mark 452 is disposed in the same layer as colored portions 26R, 26G, and 26B (see FIG. 2), and is made of the same material as any of the colored portions. FIG. 10 illustrates an example in which the second mark 452 is made of the same material as the blue colored portion 26B. As illustrated in FIG. 11, the first mark 451 and the second mark 452 have pluralities of graduations different in pitch, which makes it possible to measure the amount of positional deviation of the first mark 451 and the second mark 452 in the same manner as that with the vernier 43 of the first embodiment. FIG. 11 is a view of the first mark 451 and the second mark 452 as viewed from the back side of the liquid crystal panel 411.

In the present embodiment, as illustrated in FIG. 10, the first mark 451 and the second mark 452 are completely covered with the black matrix 25 from the front side. The first mark 451 and the second mark 452 are observed from the back side of the liquid crystal panel 411 through the light-transmissive glass substrate 31. In other words, in the present embodiment, a part of the glass substrate 31 constitutes a light-transmitting portion 31A arranged to overlap the first mark 451 and the second mark in a plan view, and the first mark 451 and the second mark 452 can be observed through the light-transmitting portion 31A. In addition, a part of the black matrix 25 constitutes a light-shielding portion 25A overlapping the light-transmitting portion 31A in a plan view. The light-shielding portion 25A is disposed on the side opposite to the light-transmitting portion 31A with respect to the first mark 451 and the second mark 452. According to the present embodiment, the second mark 452 can be formed in the step of forming the colored portion (for example, the colored portion 26B). Since the black matrix 25 has no opening, light leakage can be more reliably suppressed.

Fifth Embodiment

Figure 12:
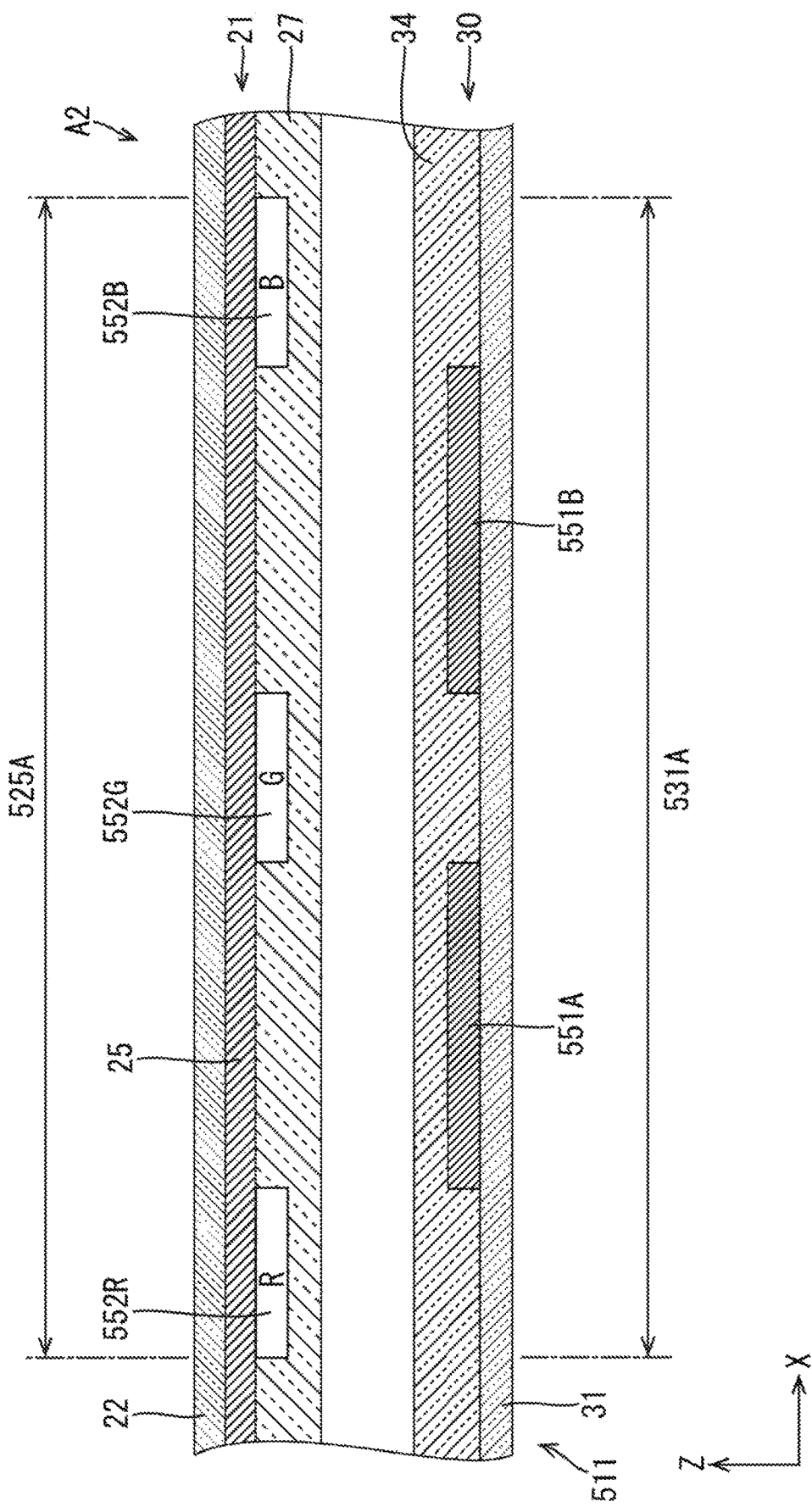
FIG. 12 is a cross-sectional view of a first mark and a second mark according to a fifth embodiment.

Next, a fifth embodiment will be described with reference to FIGS. 12 and 13. The same elements as those of the foregoing embodiment will be given the same reference signs as those of the foregoing embodiment, and duplicated descriptions thereof will be omitted. In the present embodiment, the first mark and the second mark are configured differently from those in the embodiment described above. A liquid crystal panel 511 of the present embodiment has two adjacent first marks 551A and 551B provided on an array substrate 30 as illustrated in FIG. 12. In addition, second marks 552R, 552G, and 552B are provided on a CF substrate 21. The second marks 552R, 552G, 552B are disposed in the same layer as colored portions 26R, 26G, and 26B (see FIG. 2). The second mark 552R is made of the same material as the colored portion 26R, and is formed using a mask for forming the colored portion 26R in the step of forming the colored portion 26R. The second mark 552G is made of the same material as the colored portion 26G, and is formed using a mask for forming the colored portion 26G in the step of forming the colored portion 26G. The second mark 552B is made of the same material as the colored portion 26B, and is formed using a mask for forming the colored portion 26B in the step of forming the colored portion 26B. That is, the second marks are formed using masks common to the colored portions. Therefore, the formation accuracy of the colored portions can be checked by checking the formation accuracy of the second marks (the amount of positional deviation from the first marks). In the present embodiment, as illustrated in FIG. 12, a part of a glass substrate 31 constitutes a light-transmitting portion 531A arranged to overlap the first marks 551A and 551B and the second marks 552R, 552G, and 552B in a plan view, and the first marks 551A and 551B and the second marks 552R, 552G, and 552B can be observed through the light-transmitting portion 531A. In addition, a part of the black matrix 25 constitutes a light-shielding portion 525A overlapping the light-transmitting portion 531A in a plan view.

Figure 13:
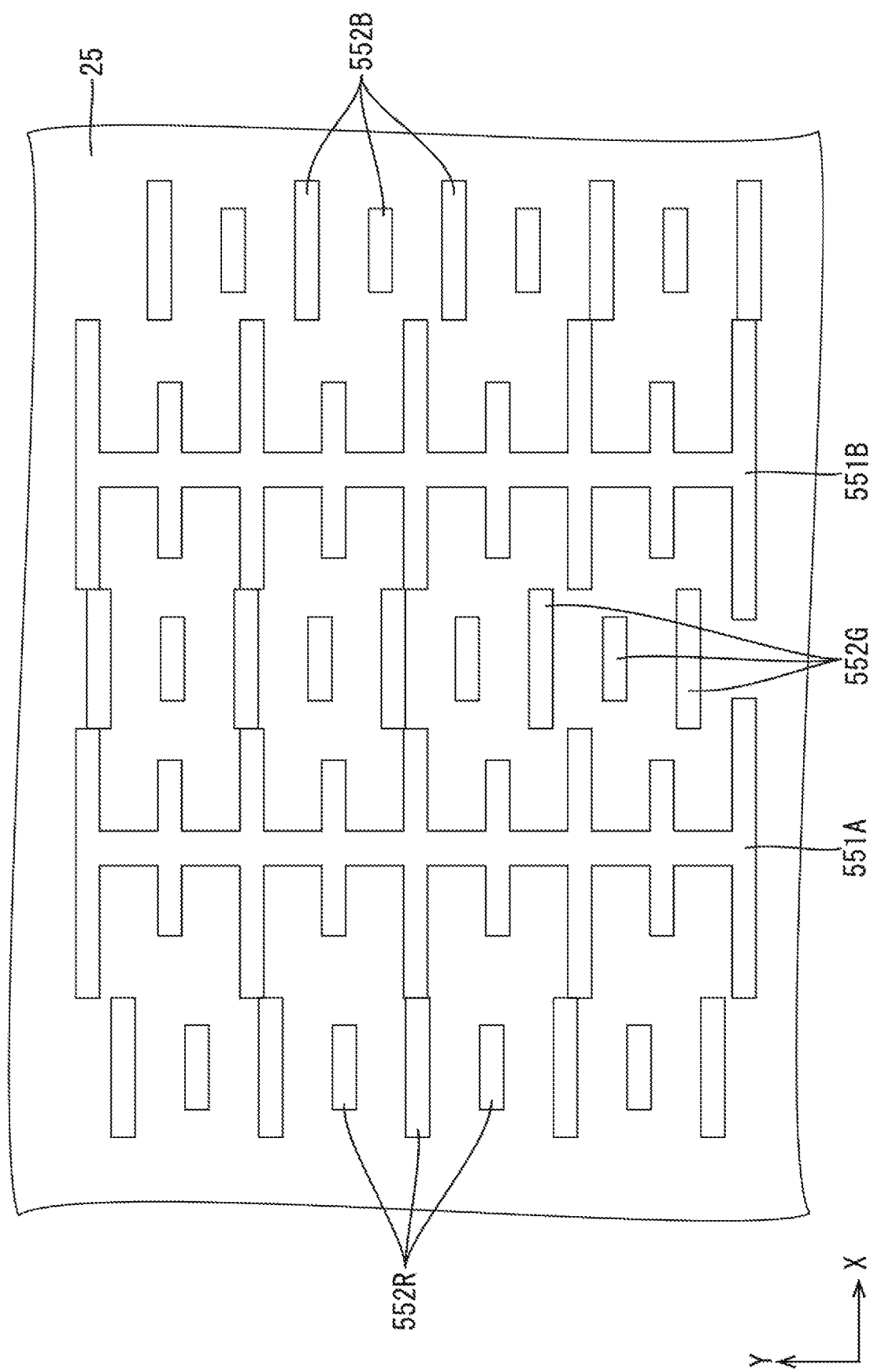
FIG. 13 is a plan view of the first mark and the second mark according to the fifth embodiment.

As illustrated in FIG. 13, the second marks 552R and 552G are arranged adjacent to the first mark 551A in a plan view, and the second marks 552G and 552B are arranged adjacent to the first mark 551B in a plan view. The first marks 551A and 551B and the second marks 552R, 552G, and 552B have graduations, which makes it possible to measure the amount of positional deviation of the first marks and the second marks in the same manner as that with the vernier 43 of the first embodiment. In the present embodiment, it is possible to measure the amount of positional deviation of the second mark 552R (or the second mark 552G) from the first mark 551A, and measure the amount of positional deviation of the second mark 552G (or the second mark 552B) from the first mark 551B. That is, it is possible to check the formation accuracy of the colored portions 26R, 26G, and 26B (for example, the accuracy of the movement amount of the masks for forming the colored portions) with reference to the first mark 551A or 551B.

Sixth Embodiment

Figure 14:
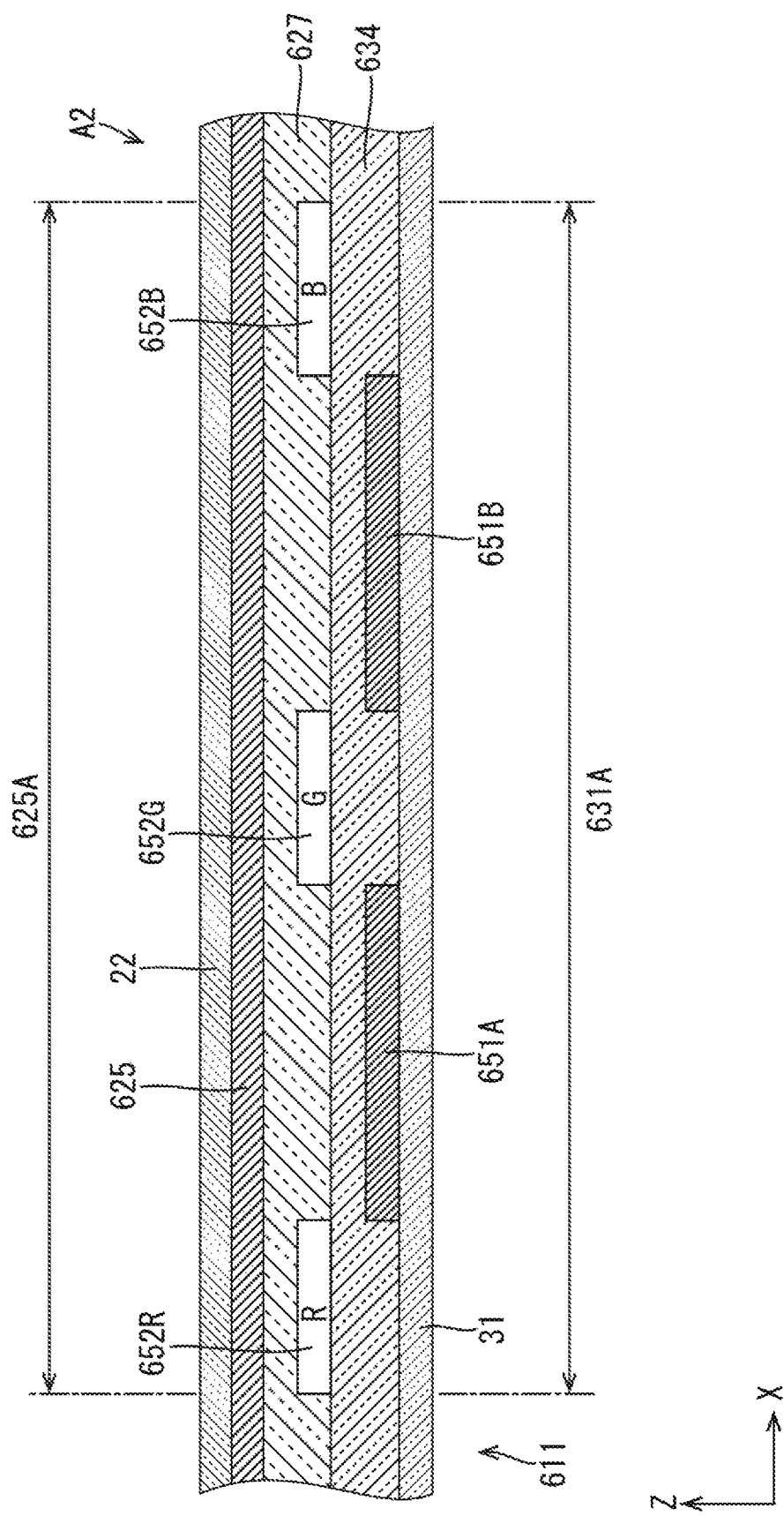
FIG. 14 is a cross-sectional view of a first mark and a second mark according to a sixth embodiment.

Next, a sixth embodiment will be described with reference to FIG. 14. The same elements as those of the foregoing embodiment will be given the same reference signs as those of the foregoing embodiment, and duplicated descriptions thereof will be omitted. In the present embodiment, an organic EL panel 611 is taken as an example of the display panel. FIG. 14 is a cross-sectional view of a non-display area A2 of the organic EL panel 611. As illustrated in FIG. 14, first marks 651A and 651B, a flattening film 634, second marks 652R, 652G, and 652B, a cover film 627, a light-shielding layer 625, and a glass substrate 22 are stacked on a glass substrate 31 in the non-display area A2 of the organic EL panel 611. In addition, the organic EL panel 611 includes light-emitting layers and a TFT connected to the light-emitting layer to control current. In the present embodiment, the light emitting layers are provided in three colors of red (R), green (G), and blue (B). The first marks 651A and 651B and the second marks 652R, 652G, and 652B have graduations, which makes it possible to measure the amount of positional deviation of the first marks and the second marks in the same manner as that with the vernier 43 of the first embodiment. In the present embodiment, as illustrated in FIG. 14, a part of the glass substrate 31 constitutes a light-transmitting portion 631A arranged to overlap the first marks 651A and 651B and the second marks 652R, 652G, and 652B in a plan view, and the first marks 651A and 651B and the second marks 652R, 652G, and 652B can be observed through the light-transmitting portion 631A. In addition, a part of the light-shielding layer 625 constitutes a light-shielding portion 625A overlapping the light-transmitting portion 631A in a plan view.

In the present embodiment, the second mark 652R is made of the same material as the red light-emitting layer, and is formed using a mask for forming the red light-emitting layer. The second mark 652G is made of the same material as the green light-emitting layer, and is formed using a mask for forming the green light-emitting layer. The second mark 652B is made of the same material as the blue light-emitting layer, and is formed using a mask for forming the blue light-emitting layer. According to the present embodiment, measuring the amount of positional deviation of each of the first marks and each of the second marks makes it possible to check the accuracy of forming each of the light-emitting layers with reference to the first mark 651A or the first mark 651B (for example, the accuracy of the movement amount of the mask for forming each of the light-emitting layers).

Seventh Embodiment

Figure 15:
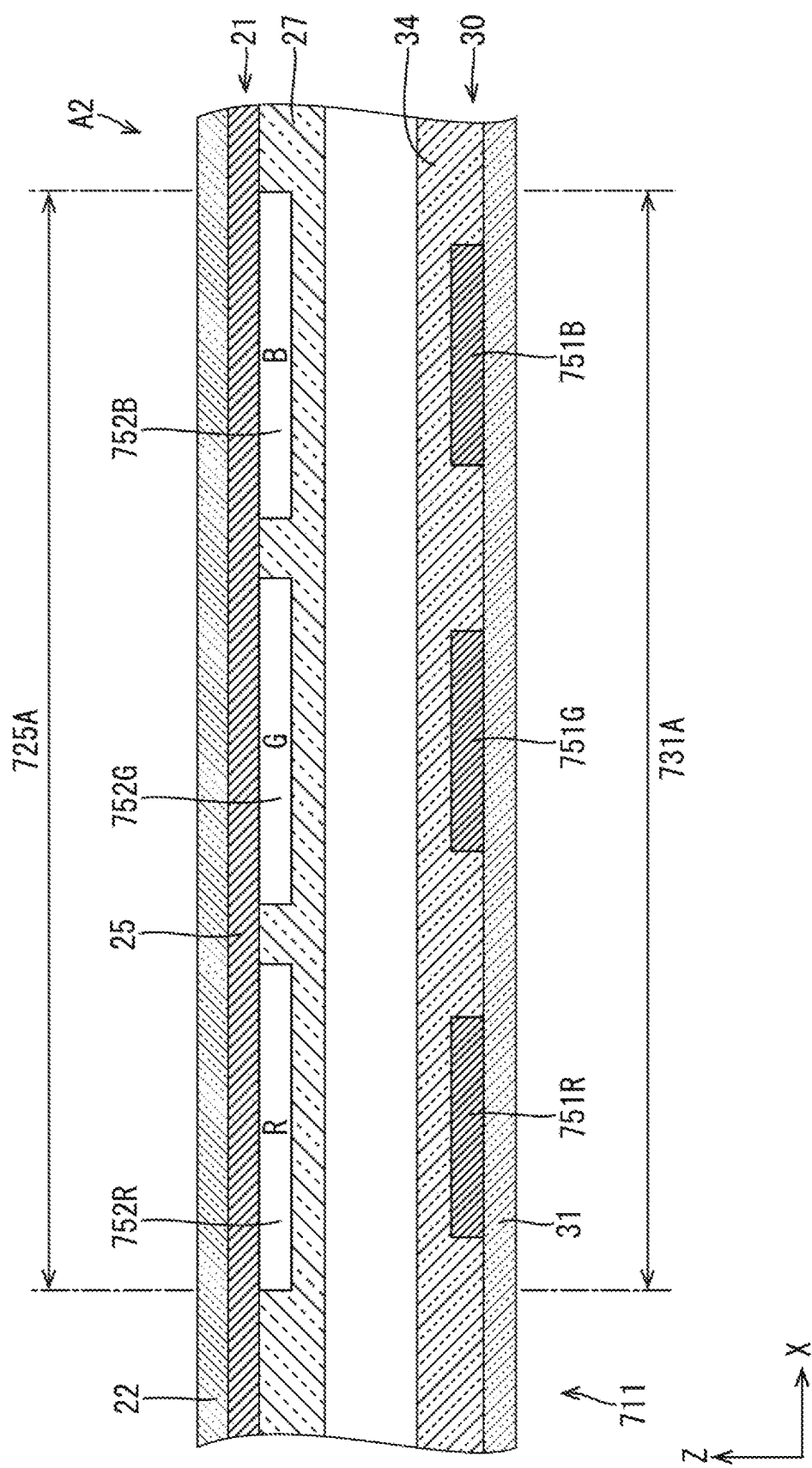
FIG. 15 is a cross-sectional view of a first mark and a second mark according to a seventh embodiment.

Next, a seventh embodiment will be described with reference to FIGS. 15 and 16. The same elements as those of the foregoing embodiment will be given the same reference signs as those of the foregoing embodiment, and duplicated descriptions thereof will be omitted. In the present embodiment, a liquid crystal panel 711 is taken as an example of the display panel. The liquid crystal panel 711 has three adjacent first marks 751R, 751G, and 751B provided on an array substrate 30 as illustrated in FIG. 15. In addition, second marks 752R, 752G, and 752B are provided on a CF substrate 21. The second marks 752R, 752G, 752B are disposed in the same layer as colored portions 26R, 26G, and 26B (see FIG. 2). The second mark 752R is made of the same material as the colored portion 26R, and is formed using a mask for forming the colored portion 26R in the step of forming the colored portion 26R. The second mark 752G is made of the same material as the colored portion 26G, and is formed using a mask for forming the colored portion 26G in the step of forming the colored portion 26G. The second mark 752B is made of the same material as the colored portion 26B, and is formed using a mask for forming the colored portion 26B in the step of forming the colored portion 26B. In the present embodiment, as illustrated in FIG. 15, a part of a glass substrate 31 constitutes a light-transmitting portion 731A arranged to overlap the first marks 751R, 751G, and 751B and the second marks 752R, 752G, and 752B in a plan view, and the first marks 751R, 751G, and 751B and the second marks 752R, 752G, and 752B can be observed through the light-transmitting portion 731A. In addition, a part of the black matrix 25 constitutes a light-shielding portion 725A overlapping the light-transmitting portion 731A in a plan view.

Figure 16:
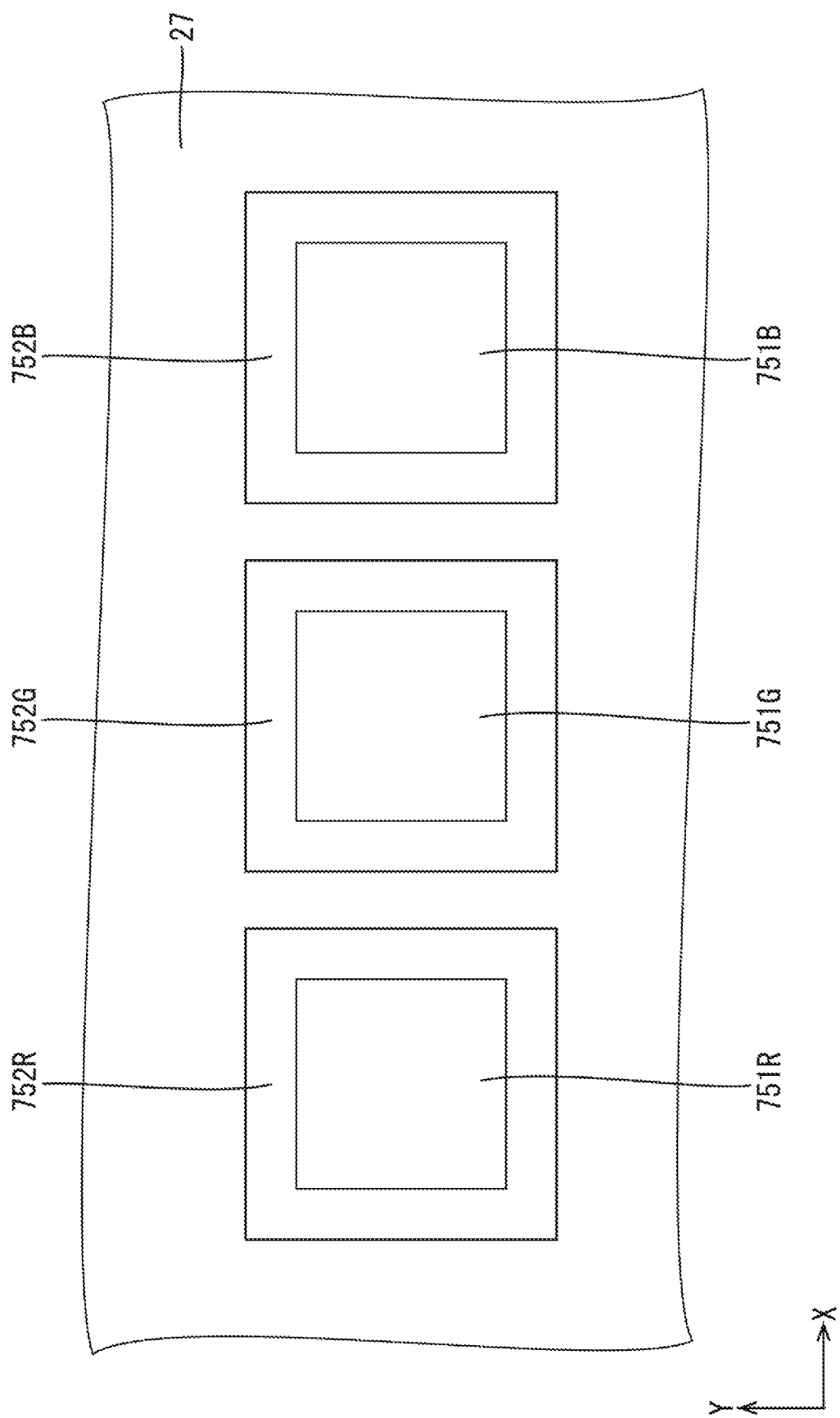
FIG. 16 is a plan view of the first mark and the second mark according to the seventh embodiment.

As illustrated in FIG. 16, the first marks 751R, 751G, and 751B have a rectangular shape. The second mark 752R has a rectangular frame shape slightly larger than the first mark 751R in a plan view. The second mark 752G has a rectangular frame shape slightly larger than the first mark 751G in a plan view. The second mark 752B has a rectangular frame shape slightly larger than the first mark 751B in a plan view. In a case where there is no positional deviation of the first marks and the second marks (the state illustrated in FIG. 16), each of the first marks is fitted to the corresponding second mark in a plan view. In the present embodiment, measuring the amount of positional deviation of each of the first marks 751R, 751G, and 751B and each of the second marks 752R, 752G, and 752B makes it possible to check the formation accuracy of each of the colored portions 26R, 26G, and 26B with respect to the first marks 751R, 751G, and 751B.

Eighth Embodiment

Figure 17:
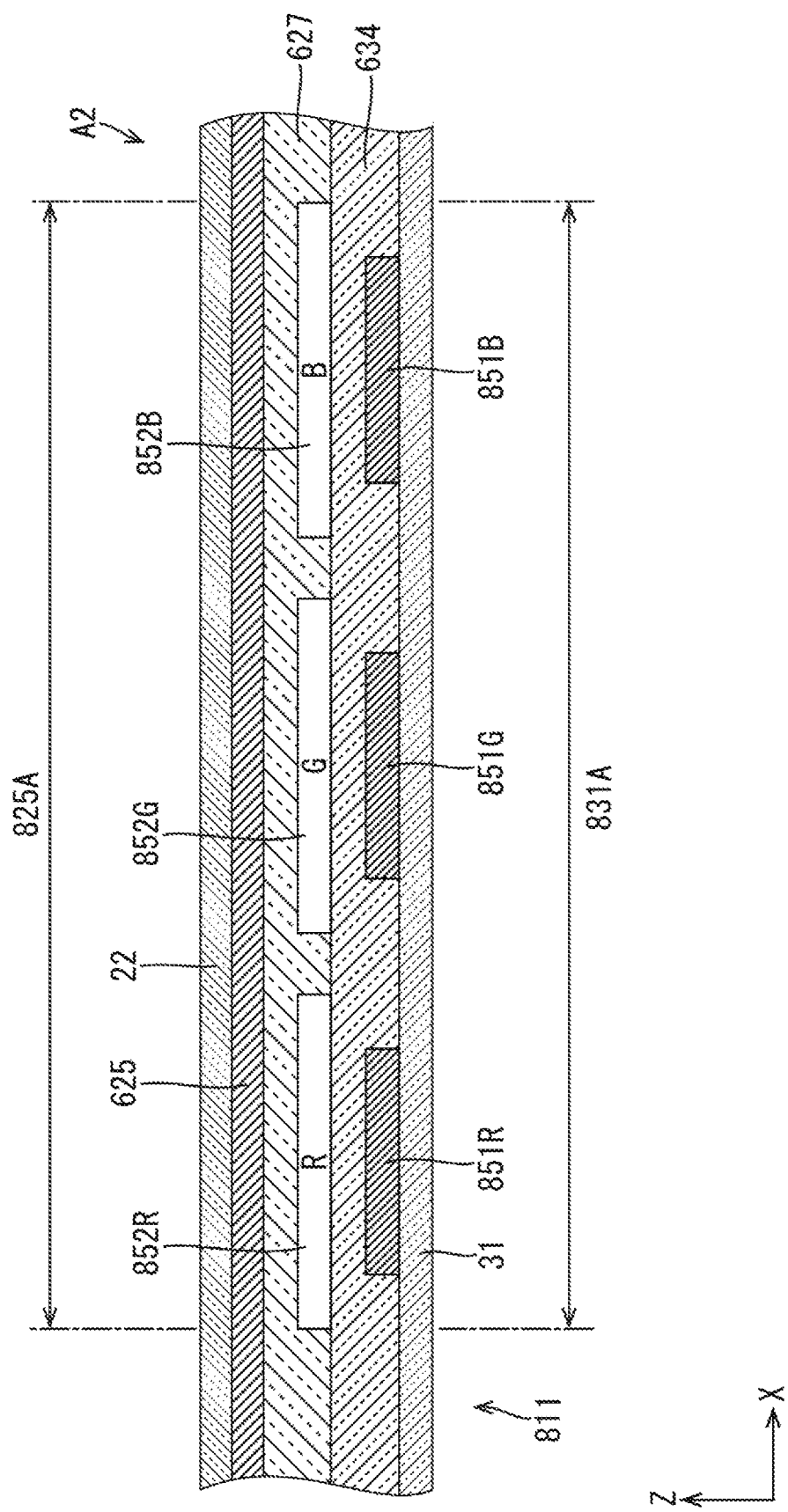
FIG. 17 is a cross-sectional view of a first mark and a second mark according to an eighth embodiment.

Next, an eighth embodiment will be described with reference to FIG. 17. The same elements as those of the foregoing embodiment will be given the same reference signs as those of the foregoing embodiment, and duplicated descriptions thereof will be omitted. In the present embodiment, an organic EL panel 811 is taken as an example of the display panel. As illustrated in FIG. 17, first marks 851R, 851G, and 851B, a flattening film 634, second marks 852R, 852G, and 852B, a cover film 627, a light-shielding layer 625, and a glass substrate 622 are stacked on a glass substrate 631 in a non-display area A2 of the organic EL panel 811. The second mark 852R is made of the same material as the red light-emitting layer, and is formed using a mask for forming the red light-emitting layer. The second mark 852E is made of the same material as the green light-emitting layer, and is formed using a mask for forming the green light-emitting layer. The second mark 852B is made of the same material as the blue light-emitting layer, and is formed using a mask for forming the blue light-emitting layer. In the present embodiment, as illustrated in FIG. 17, a part of a glass substrate 31 constitutes a light-transmitting portion 831A arranged to overlap the first marks 851R, 851G, and 851B and the second marks 852R, 852G, and 852B in a plan view, and the first marks 851R, 851G, and 851B and the second marks 852R, 852G, and 852B can be observed through the light-transmitting portion 831A. In addition, a part of the light-shielding layer 625 constitutes a light-shielding portion 825A overlapping the light-transmitting portion 831A in a plan view.

Each of the first marks 851R, 851G, and 851B has a rectangular shape, and each of the second marks 852R, 852G, and 852B has a rectangular frame shape slightly larger than the corresponding first mark. As in the seventh embodiment, in a case where there is no positional deviation of the first marks and the second marks, each of the first marks is fitted to the corresponding second mark in a plan view. According to the present embodiment, measuring the amount of positional deviation of each of the first marks 851R, 851G, and 851B and each of the second marks makes 852R, 852G, and 852B makes it possible to check the accuracy of forming each of the light-emitting layers with reference to each of the first marks 851R, 851G, and 851B (for example, the accuracy of the movement amount of the mask for forming each of the light-emitting layers).

Other Embodiments

The technology described herein is not limited to the embodiments described above and with reference to the drawings. The following embodiments may be included in the technical scope.

(1) As the display panel, a micro electro mechanical systems (MEMS) display panel can be used, for example.

(2) For example, the first marks and the second marks of the second, third, and seventh embodiments may be used as alignment marks.

(3) The first marks may be disposed in the same layer as the line other than the source line, and may be formed simultaneously with the line.

(4) In the embodiments described above, the first marks and the second marks are disposed between the pair of glass substrates 22 and 31, but the technology described herein is not limited thereto.

The invention claimed is:

1. A display panel comprising:
a display area in which an image is to be displayed;
a non-display area in which no image is to be displayed;
a first mark that is arranged in the non-display area;
a second mark that is arranged in the non-display area on a layer different from a layer on which the first mark is arranged and is adjacent to or superimposed on the first mark in a plan view;
a light-transmitting portion that is arranged in the non-display area in such a manner as to overlap at least the first mark in a plan view;
a light-shielding portion that is arranged in the non-display area on a side opposite to the light-transmitting portion with respect to the first mark and the second mark and overlaps the light-transmitting portion in a plan view;
a pair of substrates opposed to each other; and
a colored portion disposed in the display area or a light-emitting layer, wherein:
the first mark and the light-transmitting portion are provided on one of the pair of substrates,
the second mark and the light-shielding portion are provided on the other of the pair of substrates,
the second mark is disposed in the layer on which the colored portion or the light-emitting layer are disposed, and
the second mark is made of a material of which the colored portion or the light-emitting layer is made.

2. The display panel according to claim 1, further comprising a line disposed in the display area, wherein the first mark is disposed on the same layer as the line and is made of the same material as the line.

3. The display panel according to claim 1, further comprising a black matrix disposed in the display area, wherein:
the light-shielding portion is on a layer on which the black matrix is dispose, and the light-shielding portion is made of a material of which the black matrix is made.

\* \* \* \* \*